Dec. 27, 1955     C. B. MILLS     2,728,195
FLEXIBLE BOOT TO CLOSE THE OPEN END OF A HYDRAULIC BRAKE
MASTER CYLINDER AND A FLUID RETURN SYSTEM THEREFOR
Filed Nov. 19, 1954
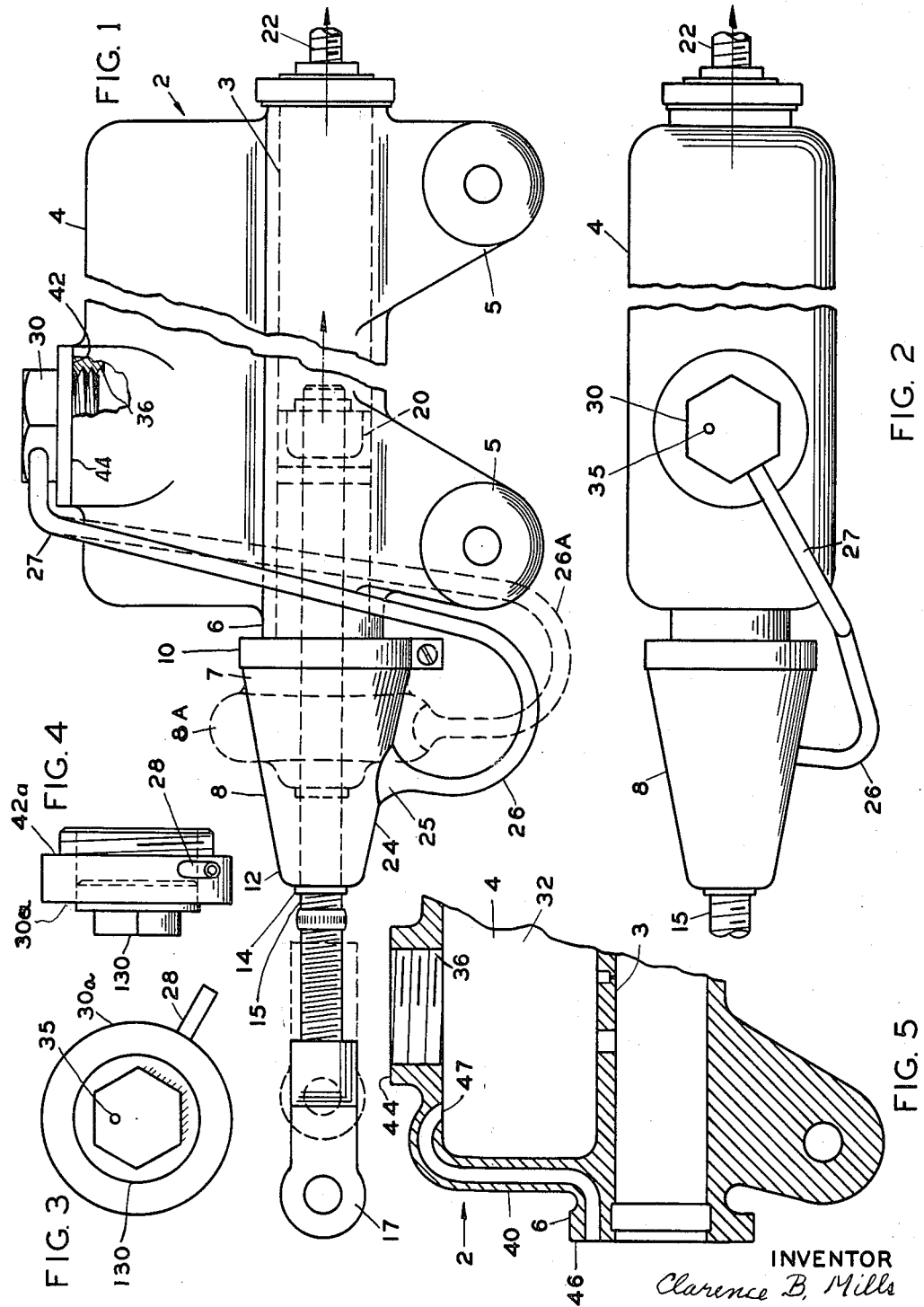
INVENTOR
Clarence B. Mills
BY Scott L. Norviel
atty

United States Patent Office 2,728,195
Patented Dec. 27, 1955

2,728,195

FLEXIBLE BOOT TO CLOSE THE OPEN END OF A HYDRAULIC BRAKE MASTER CYLINDER AND A FLUID RETURN SYSTEM THEREFOR

Clarence B. Mills, Phoenix, Ariz.

Application November 19, 1954, Serial No. 469,971

5 Claims. (Cl. 60—54.6)

This invention concerns a flexible boot to close the open end of a hydraulic brake master cylinder and a fluid return system from the boot to a fluid reservoir adjacent the cylinder.

More particularly, the invention concerns boots of the type mentioned wherein mechanism is provided for utilizing the pumping action of the boot when the brake rod and piston rod are moved inward toward the cylinder to pump excess fluid from the boot back into the fluid storage compartment normally positioned above the master brake cylinder.

It is to be understood that this boot is used on the common type of master brake cylinder wherein a fluid reservoir is cast integral with the cylinder and disposed above it. Such reservoirs are provided with a filling cap and the casting is provided with means for attaching it to the automobile frame.

Heretofore boots have been used to enclose the space between the open end of the master cylinder and the piston rod of the piston operating in the cylinder. These boots were merely dust protectors, and, while made of flexible material, were not fastened securely onto either the casting or the piston rod.

It is an object of this invention to provide a boot of flexible material, as heretofore used, but provided with a drain on its low side connected through a transparent flexible tube to the cap on top of the fluid reservoir, which is a part of the cylinder casting; such parts being arranged to pump fluid which has accumulated in the boot into the reservoir and thereby prevent its accumulation in the boot and eventual loss.

A second object is to provide a boot of pliable material attached at its outer end in fluid tight relation to the piston rod of the piston working in the master cylinder of a hydraulic brake system, and attached at its inner end in fluid tight relation to the open end of the master cylinder; said boot being provided with a flexible and transparent drain tube connecting its bottom portion to the top portion of the oil reservoir above the master cylinder.

Still another object of the invention is to provide a boot, as above described, which is secured in fluid tight relation to both the piston rod and the open cylinder end and to provide an opening within the master cylinder casting leading from a small opening adjacent the open end of the master cylinder to the upper part of the oil reservoir.

Still another object is to provide, in a combination of parts as above stated, a cap which can be used to close the filling hole in the top of the oil reservoir of a master cylinder casting which has a radial tube extending from the inside of the cap radially outward and being adapted to receive an end of a flexible transparent tube.

Other objects will appear hereinafter.

I attain the foregoing objects by means of the devices, apparatus and combinations of parts shown in the accompanying drawing in which—

Figure 1 is a side elevation of a hydraulic brake master cylinder casting, including my improved boot and fluid return tube and filling cap fitting.

Figure 2 is a plan view thereof.

Figure 3 is a plan view of a modified form of filling cap fitting;

Figure 4 is a side elevation of said modified form of filling cap fitting; and

Figure 5 is a midsectional elevation of a fragment of a master cylinder casting showing a passageway from the flange at the open end of the master cylinder to the top portion of the fluid reservoir positioned above the master cylinder.

Similar numerals refer to similar parts in the several views.

Referring to the drawing, 2 indicates the master cylinder casting in general, 3 the master cylinder in particular, 4 the fluid reservoir positioned above the master cylinder, and 5 attaching lugs for securing the casting to the automobile frame.

At the open end 6 of the master cylinder 3 the inner end 7 of boot 8 is secured by means of clamp 10. The outer end 12 of this boot is secured by a reinforced ferrule 14 to the master cylinder piston rod 15. It is to be understood that the piston rod continues on to a clevis 17 which is operated by the foot brake lever of the automobile. Piston 20 operates within cylinder 3 in the usual manner and delivers fluid to the brake mechanism through a tube 22.

Since, in operation, it has been found that hydraulic brake fluid is apt to leak past piston 20 and work toward the open end 6 of the piston, I have found that by enclosing the open end of the piston with boot 8, as above mentioned, this fluid can be confined within the boot. Along the bottom portion 24 of the boot I provide a fitting 25 of flexible pliant material which is made integral with the boot and with a tube portion 26 which extends upwardly and has its upper terminus 27 fitted onto a radial tube 28 which extends outward from the filling cap 30. Tube 26 is preferably of transparent flexible material such as Vinylite or other suitable transparent flexible material. Tube 26 extends into the inner portion of the cap 30 and, therefore, communicates with the interior 32 of the fluid reservoir 4.

In Figure 1 the boot is shown in extended position, as when no pressure is applied to the brake lever, and the master piston 20 is at the outer end portion of master cylinder 3. When pressure is applied to the brake levers and the master cylinder piston rod 15 is pushed inward, as in setting the brakes, the boot 8 takes the position shown in dotted outline 8a. At the same time the flexible tube 26 moves toward the casting 2, as indicated by the dotted lines 26a. When this position is assumed, the area within the boot is diminished and any fluid that may have leaked by piston 20 into the outer end portion 6 of the master cylinder will be forced upward through tube 26 and into the top of cap 30. From the cap the fluid will flow down into the reservoir 4. Since the cap is vented at 35 fluid added by the means just described will be added to that already within the reservoir and the combined fluids will flow into the master cylinder and be forced into the brake mechanism according to the usual practice.

Since tube 26 is transparent, an inspection of the mechanism will easily disclose whether any considerable amount of fluid has passed into the boot and whether fluid is being transferred back into the reservoir. Therefore, if this condition persists throughout several inspections it will be easily determined if repair of the master cylinder is necessary.

Whereas I have specified above that the upper end 27 of tube 26 is attached to and extends into cap 30, it is to be understood that other means of delivering fluid from tube 26 into reservoir 4 may be used. For example, in the modification shown in Figures 3 and 4 outlet tube 28 extends radially through and from a threaded bushing 30a onto which the outlet end of tube 26 may be fitted. This bushing has a shoulder 42 similar to that on cap 30, Figure 1, and screws into threaded opening 36 in the top of reservoir 4 and closes on rim 44. A cap 130 similar to cap 30 then screws into this bushing. Cap 130 may be removed for filling reservoir 4 without disconnecting tube 26 from the radial tube 28, whereas in the form shown in Figure 1, it is necessary to remove tube 26 from cap 30 when unscrewing it from the reservoir.

A further modification of the delivery of fluid may be made by providing a channelway 40 in the casting 2 extending from the face 46 of the open end 6 of cylinder 3 to the top portion 47 of reservoir 4. In this case whenever an excess of fluid accumulates in the boot 8 it will be forced through the channelway 40 into the reservoir 4 when the boot is compressed, as shown by dotted lines 8a. In this case no outside tube 26 is needed. However, in order to expedite an inspection a cap 30 with a transparent top may be used so that the level of the hydraulic brake fluid may be easily observed. Alternately, cap 30 may be entirely made of plasitcized transparent material.

I claim:

1. In a master brake cylinder having a body with an open end, a brake fluid reservoir disposed above said cylinder body, a piston having a rod extending from the open end of said cylinder, a boot of flexible material secured at one end in fluid tight relation to the open end of said cylinder, and in fluid tight relation to said piston rod at the other end, and a channelway connecting the interior of said boot to the upper part of the interior of said fluid reservoir.

2. In a master brake cylinder having a body with an open end, a brake fluid reservoir disposed above said cylinder body, a piston having a rod extending from the open end of said cylinder, a boot of flexible material secured at one end in fluid tight relation to the open end of said cylinder, and in fluid tight relation to said piston rod at the other end, and a tube of pliant transparent material connecting the bottom portion of said boot to the upper portion of the interior of said reservoir.

3. In a master brake cylinder having a body with an open end, a brake fluid reservoir disposed above said cylinder body having a filling opening at the top closed by a cap having a radially extending tube communicating with the upper part of the interior of said reservoir, a piston operating in said cylinder having a piston rod extending outward from the open end of said cylinder, a boot of flexible material having a large front end and a smaller rear end, enclosing the open end of said cylinder, and having the front end secured to the open end of said cylinder in fluid tight relation, and the rear end secured to said piston rod in fluid tight relation to said piston rod, and a tube of pliant transparent material connecting the interior of said boot with the radial tube on said reservoir cap.

4. In a master brake cylinder having a body with an open end, a brake fluid reservoir disposed above said cylinder body having a threaded filling opening at the top, a piston operating in said cylinder having a piston rod extending outward from the open end of said cylinder, a boot of flexible material having a large front end and a smaller rear end, enclosing the open end of said cylinder, and having the front end secured to the open end of said cylinder in fluid tight relation, and the rear end secured to said piston rod in fluid tight relation to said piston rod, a cap having a threaded portion threaded into the filling opening of said reservoir in fluid tight relation therewith and having a breather vent and a radially extending tube opening into said reservoir through said cap, and a tube of pliant transparent material connecting the interior of said boot with the radial tube on said reservoir cap.

5. In a master brake cylinder having a body with an open end, a brake fluid reservoir disposed above said cylinder body having a threaded filling opening at the top, a piston operating in said cylinder having a piston rod extending outward from the open end of said cylinder, a boot of flexible material having a large front end and a smaller rear end, enclosing the open end of said cylinder, and having the front end secured to the open end of said cylinder in fluid tight relation, and the rear end secured to said piston rod in fluid tight relation to said piston rod, a bushing having a threaded portion threaded into the filling opening of said reservoir in fluid tight relation therewith, a radially extending tube opening into said reservoir through said bushing, and a cap, having a vent opening, fitted into said bushing in fluid tight relation therewith, and a tube of pliant transparent material connecting the interior of said boot with the radial tube on said bushing.

References Cited in the file of this patent
UNITED STATES PATENTS 2,050,702    Jackson _____ Aug. 11, 1936